United States Patent
Kopf et al.

(10) Patent No.: US 8,989,548 B2
(45) Date of Patent: Mar. 24, 2015

(54) CONNECTION BOX FOR GLASS FIBER CABLES

(75) Inventors: Pia Kopf, Berlin (DE); Ulrich Hetzer, Mahlow (DE); Thomas Fischer, Rackwitz/Zschortau (DE)

(73) Assignee: Tyco Electronics Services GmbH, Schaffhausen (CH)

( * ) Notice: Subject to any disclaimer, the term of this patent is extended or adjusted under 35 U.S.C. 154(b) by 11 days.

(21) Appl. No.: 13/582,968

(22) PCT Filed: Jan. 10, 2011

(86) PCT No.: PCT/EP2011/000059
§ 371 (c)(1),
(2), (4) Date: Dec. 3, 2012

(87) PCT Pub. No.: WO2011/107181
PCT Pub. Date: Sep. 9, 2011

(65) Prior Publication Data
US 2013/0236150 A1 Sep. 12, 2013

(30) Foreign Application Priority Data
Mar. 5, 2010 (DE) .................. 10 2010 010 428

(51) Int. Cl.
*G02B 6/00* (2006.01)
*G02B 6/44* (2006.01)
*F21V 8/00* (2006.01)

(52) U.S. Cl.
CPC ............ *G02B 6/4401* (2013.01); *G02B 6/4447* (2013.01); *G02B 6/0008* (2013.01); *G02B 6/4441* (2013.01); *G02B 6/4446* (2013.01); *G02B 6/4439* (2013.01); *G02B 6/4454* (2013.01)

USPC ........... 385/135; 385/134; 385/136; 385/137; 385/138; 385/139

(58) Field of Classification Search
CPC .. G02B 6/4446; G02B 6/4447; G02B 6/4448; G02B 6/4439; G02B 6/444
USPC .................................. 385/134–139
See application file for complete search history.

(56) References Cited

U.S. PATENT DOCUMENTS 5,724,467 A    3/1998  vandenEnden et al.
5,781,686 A *  7/1998  Robinson et al. ............. 385/135

(Continued)

FOREIGN PATENT DOCUMENTS

DE       601 16 952      9/2006
DE    20 2007 005 870    8/2007

(Continued)

OTHER PUBLICATIONS

International Search Report for International Application No. PCT/EP2011/000059 mailed Oct. 12, 2011.

*Primary Examiner* — Ryan Lepisto
*Assistant Examiner* — Guy Anderson
(74) *Attorney, Agent, or Firm* — Merchant & Gould P.C.

(57) ABSTRACT

The invention relates to a connecting box (1) for glass fiber cables, comprising a housing which is formed from at least two parts and has a lower part and a cover (2), with at least one holder (20) for a coupling (30) for holding glass fiber plugs being arranged within the housing, wherein the holder (20) is in the form of a double frame which comprises two first vertical struts (21) and two second vertical struts (22), with the second struts (22) being arranged closely to a front face (5, 40) of the cover (2) and of the lower part (3), and with the coupling (30) optionally being latchable to the first or the second struts (21, 22).

9 Claims, 10 Drawing Sheets

(56) References Cited

U.S. PATENT DOCUMENTS

| | | |
|---|---|---|
| 6,275,641 B1 | 8/2001 | Daoud |
| 6,661,961 B1 | 12/2003 | Allen et al. |
| 8,199,786 B2 * | 6/2012 | Gaillard et al. ............... 372/34 |
| 2005/0094392 A1 * | 5/2005 | Mooney ..................... 362/241 |
| 2005/0135768 A1 | 6/2005 | Rapp et al. |
| 2009/0202214 A1 * | 8/2009 | Holmberg et al. ............ 385/135 |
| 2009/0208178 A1 * | 8/2009 | Kowalczyk et al. ........... 385/135 |
| 2009/0238531 A1 * | 9/2009 | Holmberg et al. ............ 385/135 |
| 2009/0258534 A1 | 10/2009 | Bright et al. |
| 2009/0269019 A1 | 10/2009 | Andrus et al. |
| 2009/0304342 A1 * | 12/2009 | Adomeit et al. .............. 385/135 |
| 2010/0028017 A1 * | 2/2010 | Mizoguchi .................... 398/141 |
| 2010/0329626 A1 | 12/2010 | Nad et al. |
| 2011/0216793 A1 * | 9/2011 | Gaillard et al. ................. 372/34 |
| 2012/0292096 A1 * | 11/2012 | Wakileh et al. ............... 174/480 |

FOREIGN PATENT DOCUMENTS

| | | |
|---|---|---|
| DE | 10 2008 010 592 | 8/2009 |
| DE | 10 2008 027 381 | 12/2009 |
| EP | 2 116 881 | 11/2009 |
| WO | WO 00/65397 | 11/2000 |

* cited by examiner

CONNECTION BOX FOR GLASS FIBER CABLES

This application is a National Stage Application of PCT/EP2011/000059, filed 10 Jan. 2011, which claims benefit of Serial No. 10 2010 010 428.0, filed 5 Mar. 2010 in Germany and which applications are incorporated herein by reference. To the extent appropriate, a claim of priority is made to each of the above disclosed application

BACKGROUND

The invention relates to a connecting box for glass fiber cables, comprising a housing which is formed from at least two parts and has a lower part and a cover, with at least one holder for a coupling for holding glass fiber plugs being arranged within the housing.

DE 10 2008 027 381 A1 discloses a connecting box for glass fiber cables, comprising a housing which is formed from at least two parts and has a lower part and a cover, with the cover being arranged pivotably on the lower part, at least one holder for a splice, at least one feed for a glass fiber cable and a holder for a coupling, with the side surfaces of the cover being longer than the end surfaces of the cover, and with a pivoting bearing of the cover on an end surface of the cover. The holder for the coupling is arranged with respect to an end surface of the lower part and of the cover such that the inserted coupling ends virtually with the end surface, such that a glass fiber plug can be inserted into and withdrawn from one face of the coupling, from outside the connecting box, even when the cover is closed.

Applications are possible where, for various reasons, it should not be possible to pull an inserted glass fiber plug out directly, for example for safety reasons because of the laser light emerging, or to prevent manipulations.

SUMMARY

The invention is based on the technical problem of providing a connecting box which can be used flexibly and by means of which a physical form can easily be produced in which an outer glass fiber plug, which is plugged into a coupling, is secured or unsecured, as required.

To this end, the connecting box for glass fiber cables comprises a housing which is formed from at least two parts and has a lower part and a cover, with at least one holder for a coupling for holding glass fiber plugs being arranged within the housing, wherein the holder is in the form of a double frame which comprises two first vertical struts and two second vertical struts, with the second struts being arranged closely to a front face of the cover (in the closed state) and of the lower part, and with the coupling optionally being latchable to the first or the second struts. This means that, depending on the latching of the coupling, the face of the coupling for insertion of the outer glass fiber plug ends with the front face, or is recessed into the interior of the housing. In the latter case, the folded-down cover then secures the inserted glass fiber plug from being pulled out. In this case, the holder for couplings may be formed integrally or in one part with the lower part, or else may be connected as a separate component to the lower part. The holder is preferably in the form of a double holder for two couplings.

In a further preferred embodiment, the lower part is formed with a latching holder, into which an active or passive electrical or optical component can optionally be inserted. In this case, the holder for the couplings is preferably connected integrally to the lower part. By way of example, a further holder for couplings for glass fiber plugs or electrical circuits such as RJ sockets and/or core connectors can then be latched into the latching holder. By way of example, a Cat-TV module or a WDM module can be inserted as active components. The connecting box can therefore be highly flexibly matched to different applications.

Particularly when using active optical or electrical components, LEDs or other optical signalling means are used, and these are typically installed on a front face. Because of the arrangement within the connecting box, these would therefore emit via the end surface, although this would lead to difficulty in reading them, particularly when the connecting box is mounted on a wall.

At least one optical deflection element is therefore preferably arranged in the connecting box, the optical output of which optical deflection element is aligned with an upper face of the cover, with the cover being transparent in this area. The signaling can in this way be perceived on the cover. By way of example, the deflection element may be in the form of a glass fiber, reflective coating on the housing or optical element which is composed, for example, of PMMA. In this case, by way of example, the cover transparency can be achieved by a transparent window which is adhesively bonded, for example, into the cover. Alternatively, the material thickness of the cover can be reduced in this area, as a result of which the light then emerges to an adequate extent through this thinned area. In this case, a weak point can be provided in this area on the cover, and is knocked out by the inserted deflection element. In this case, the deflection element can be arranged in the lower part or in the cover.

In a further embodiment, a pivotable support having at least one holder for splices is arranged between the lower part and the cover, with the support and the holder being formed integrally.

The support preferably has a latching holder in which one further holder for splices or a coupling for glass fiber plugs can optionally be latched, thus further increasing the flexibility in use.

In a further embodiment, a pivoting bearing which has an open contour is arranged on the lower part. In this case, the pivoting bearing may be composed of one or more parts. One possible embodiment is slotted cylinders in which case, for example, the opening angle is between 30° and 180°. The support is preferably formed with an opposing bearing which can rotate about the pivoting bearing of the lower part, that is to say the pivoting bearing cannot move on the lower part.

Drop cables, cores or fibers are therefore preferably guided in the pivoting bearing.

BRIEF DESCRIPTION OF THE DRAWINGS

The invention will be explained in more detail in the following text with reference to one preferred exemplary embodiment. In the figures.

DETAILED DESCRIPTION

Figure 1:
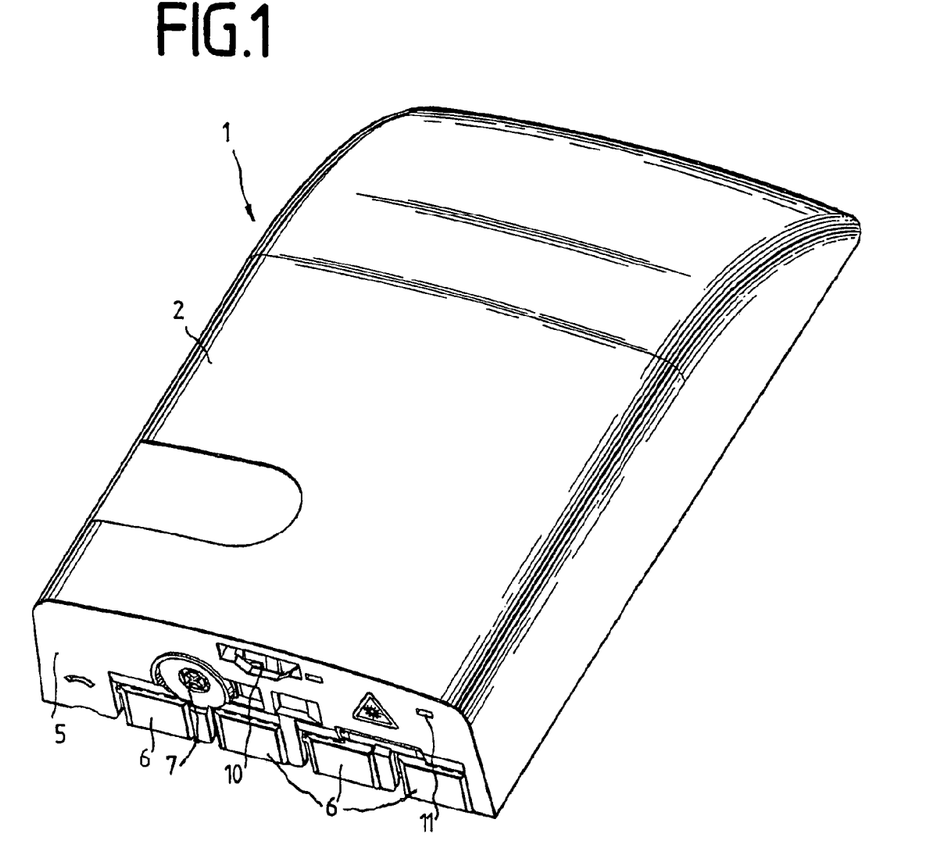
FIG. 1 shows a perspective front view of the cover with an LED deflection element.
Figure 2:
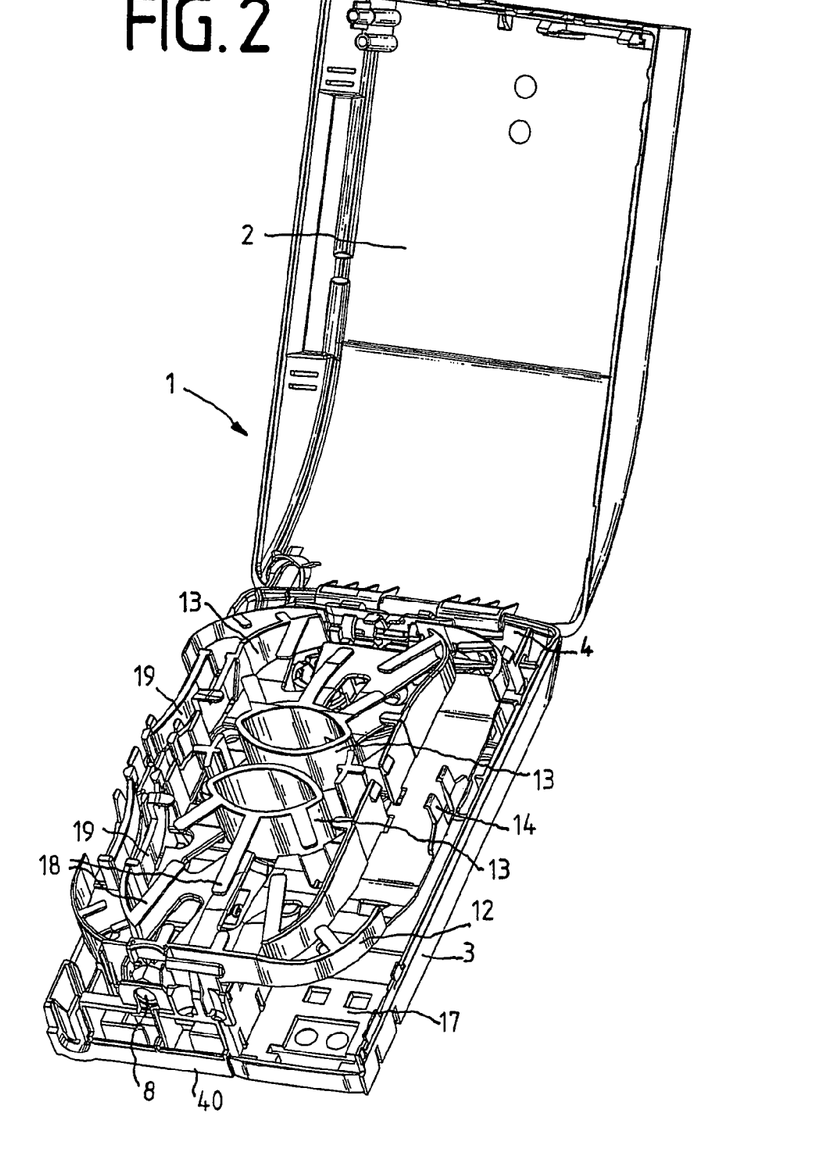
FIG. 2 shows a perspective front view of the connecting box with the cover pivoted open.
Figure 3:
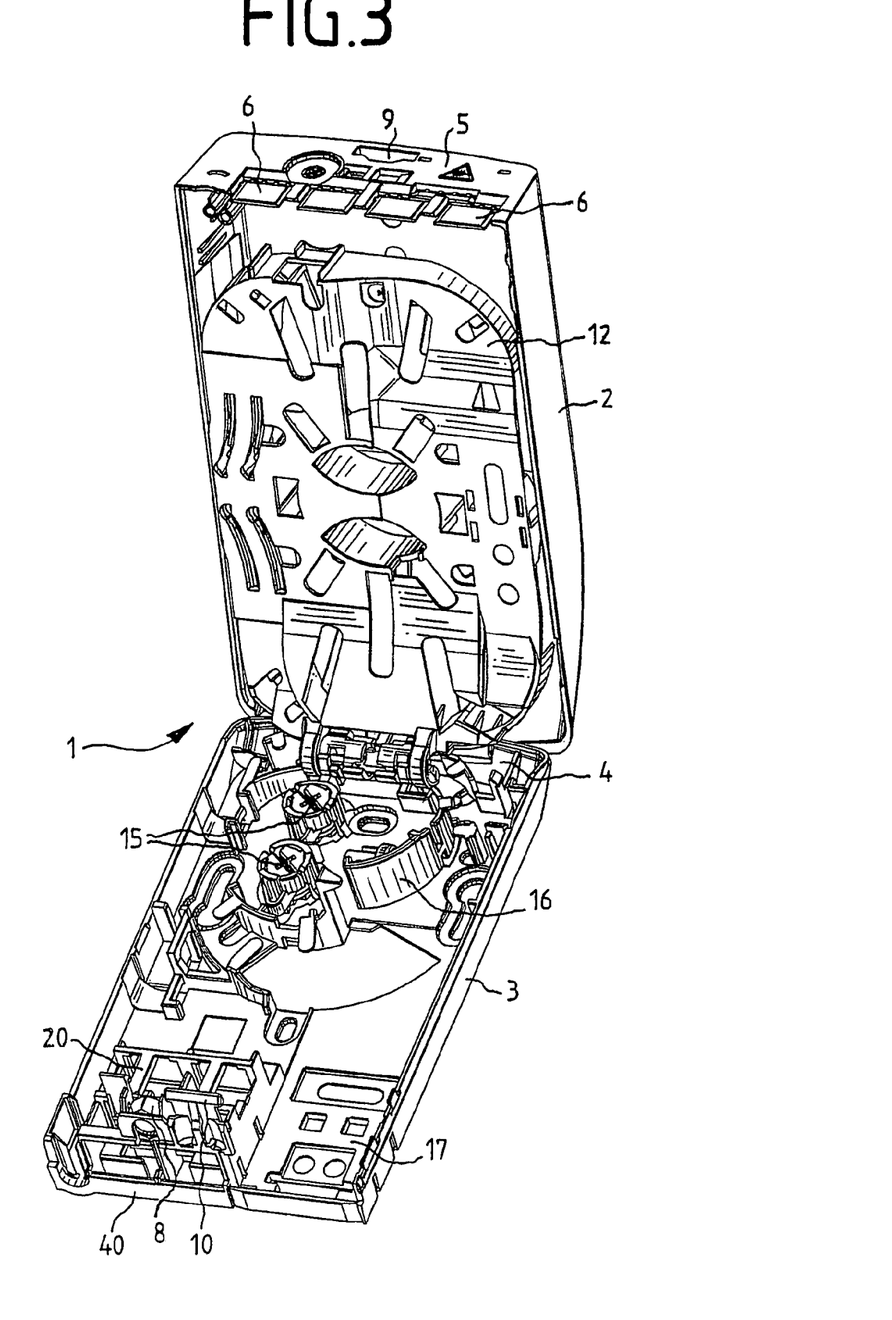
FIG. 3 shows a perspective front view of the connecting box with the support pivoted open.

The connecting box 1 illustrated in FIGS. 1 to 3 comprises a cover 2 and a lower part 3. In this case, the cover 2 is articulated such that it can pivot on a rear end surface 4 of the lower part 3, and the cover 2 may in this case have one or more latching positions. On a front end surface 5, the cover 2 has lugs 6 which have predetermined breaking points and can be knocked out of the cover 2 as required. Furthermore, FIG. 1 shows a holder 7 for a securing screw, which can be screwed into a thread 8 in the lower part 3. The cover 2 has an opening 9, into which a lug 10 on the lower part 3 latches in the closed state. Dashed lines in FIG. 1 show an optical deflection element 11, which is illustrated in detail in FIG. 11 and will also be explained in more detail later. Furthermore, the connecting box 1 has a support 12 which is articulated pivotably on the lower part 3 and is illustrated in a basic position in FIG. 2, and in a pivoted open position in FIG. 3. Various fiber guide elements 13 and hold-down devices 18 are arranged on the support 12. Furthermore, the support 12 has two holders 19 for four splices or else splitters as well as a latching holder 14 into which various elements can be latched, as will also be explained in more detail later. The lower part 3 has two strain relief means 15 as well as elements 16 for the fiber and cable guidance. Furthermore, the lower part 3 has a holder 20 for couplings 30 (see FIG. 4) and a further latching holder 17.

Figure 4:
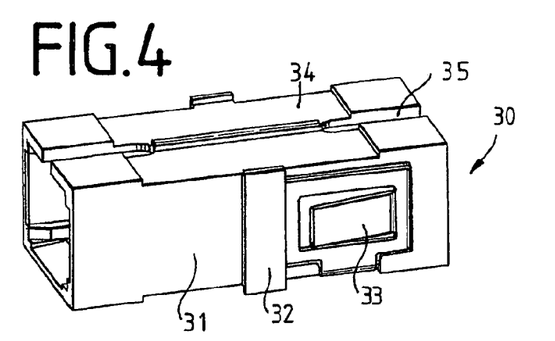
FIG. 4 shows a perspective illustration of a standard coupling (prior art)

The holder 20 for couplings 30 will now be explained in more detail with reference to FIGS. 4-8. In this case, FIG. 4 illustrates a standard coupling for SC plugs. The coupling 30 is essentially cuboid, with a stop edge 32 and a spring lug 33 being arranged on each of the end surfaces 31. Furthermore, the coupling 30 has a groove 35 on the upper face 34. A coupling 30 such as this is prior art, and will therefore not be described any further here. In this case, it should just be noted that the coupling may also be in the form of a coupling for glass fiber plugs other than SC plugs, for example LC, E2000 or LX.5 plugs.

Figure 5:
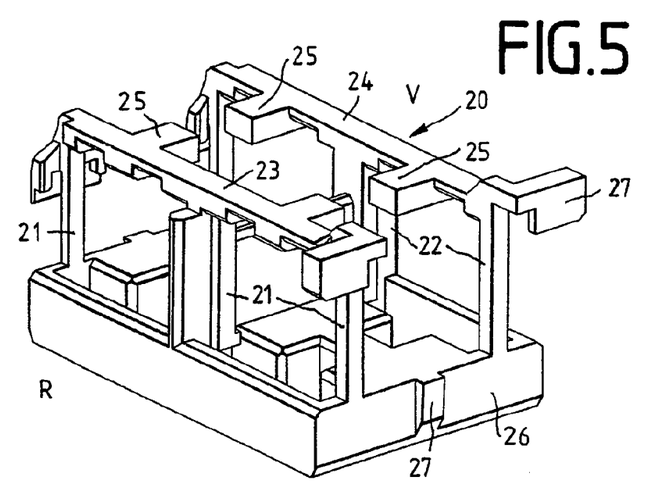
FIG. 5 shows a first perspective illustration of a holder, in the form of a double frame, for couplings.
Figure 6:
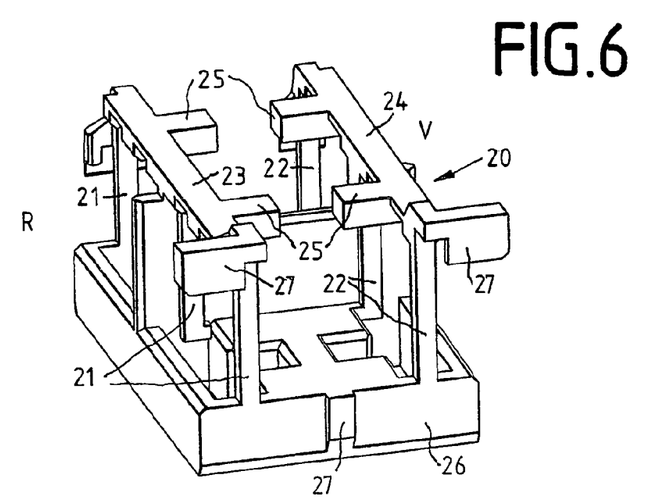
FIG. 6 shows a second perspective illustration of the double frame.
Figure 7:
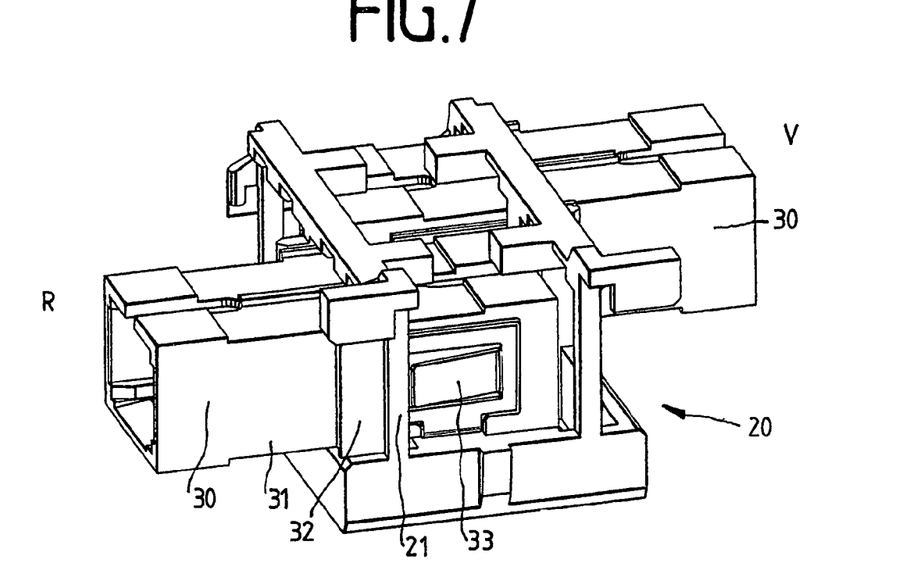
FIG. 7 shows a first illustration with couplings inserted into the double frame.
Figure 8:
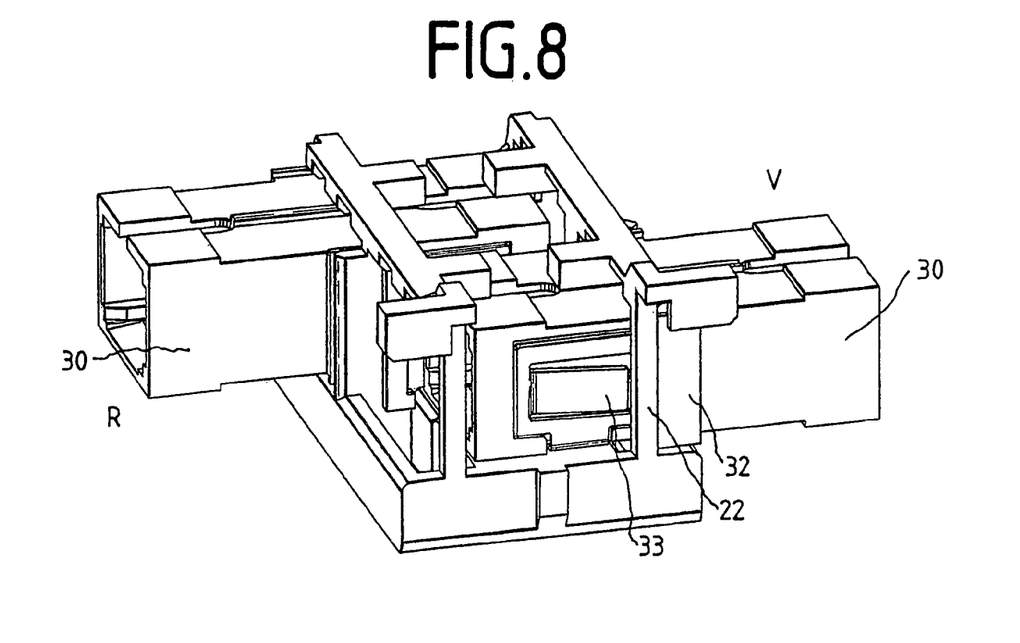
FIG. 8 shows a second illustration with couplings inserted into the double frame.

FIGS. 5 and 6 illustrate the holder 20 for couplings 30 without couplings, and FIGS. 7 and 8 with couplings 30 inserted. The holder 20 is in the form of a double holder, that is to say it can hold two couplings 30. The holder 20 has twice two first vertical struts 21 and two second vertical struts 22, with the struts 21 and the struts 22 each being connected to one another via common upper lateral stays 23, 24. The lateral stays 23, 24 in this case each have vertically projecting webs 25, with the webs 25 being aligned flush with one another. All the struts 21, 22 are connected to one another on the lower face via a common base part 26. The holder 20 is in this case preferably in the form of an integral injection-molded part. Latching elements 27 are arranged on each of the outer struts 21, 22 and are used to allow the holder 20 to be latched in the latching holder 17 in the lower part 3. In contrast, if the holder 20 is formed integrally with the lower part 3, then there is no need for these latching elements 27. The holder 20 is now inserted into the lower part 3 such that the second struts 22 are arranged closer to a front end surface 40 of the lower part 3. In this case, the side of the second strut 22 is referred to as the front face V, and the side of the first strut is referred to as the rear face R.

A coupling 30 can be inserted into the holder 20 from the front face V or from the rear face R. The illustration in FIG. 7 shows the front coupling 30 being inserted from the rear face R, and the rear coupling 30 from the front face V. When the front coupling 30 is being inserted into the holder 20, the spring lugs 33 are forced in the direction of the side surface 31 by the first struts 21. The stress in the spring lines 33 is then released behind the first struts 21, and the stop edges 32 strike against the first struts 21 from the rear face. The coupling 30 is latched. Analogously, the coupling 30 with spring lugs 33 and stop edges 32 latches on the second struts 22 when the coupling is inserted into the holder 20 from the front face V (see in particular FIG. 8). The opening, which is located on the front face, of the coupling 30 for glass fiber plugs is located outside the holder 20 or inside the holder 20, depending on whether the coupling 30 is inserted from the front face V or from the rear face R.

Figure 9A:
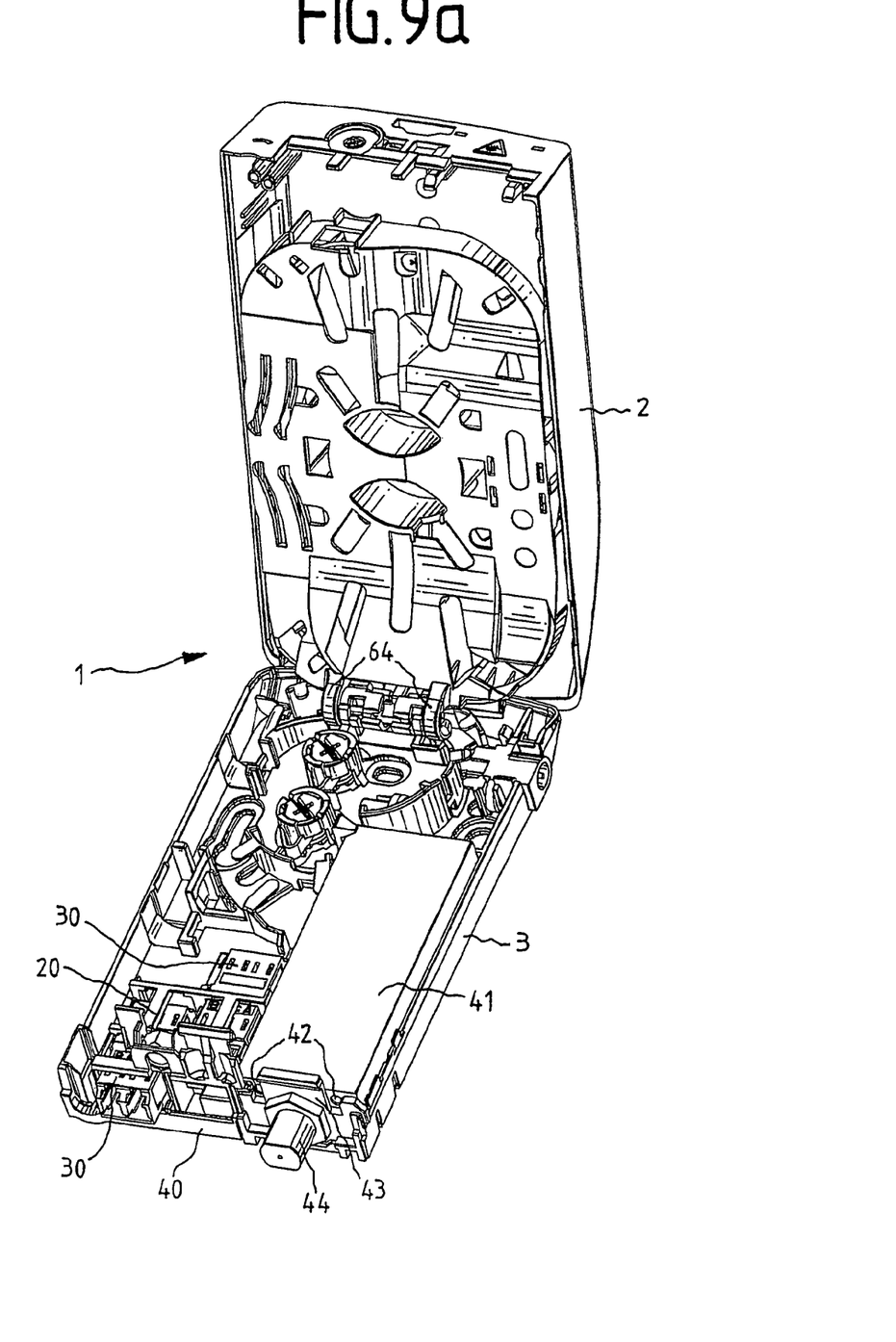
FIG. 9*a* shows a perspective illustration with a Cat-TV module.

FIG. 9*a* now illustrates how this is done in conjunction with the lower part 3 and cover 2. In this case, the left-hand coupling 30 is inserted into the holder 20 from the front face V, and the right-hand coupling 30 is inserted into the holder 20 from the rear face R. In this case, the front part of the left-hand coupling 30 ends flush with the front end surface 40 of the lower part 3 while, in contrast, the front part of the right-hand coupling 30 is located in the holder 20. When glass fiber plugs are now inserted into each of the front parts of the couplings 30 and the cover 2 is closed, then the glass fiber plug and the left-hand coupling 30 can still be pulled, since it is still located largely outside the connecting box 1. In contrast, the glass fiber plug in the right-hand coupling 30 cannot be pulled, since the glass fiber plug is located completely in the connecting box 1, and is thus secured by the cover 2 against being pulled out.

FIG. 9*a* also shows a Cat-TV module 41 with LEDs 42 being latched in the latching holder 17 in the lower part 3. In this case, a panel 43, which is matched to the Cat-TV module 41, is arranged on the front end surface 40, and a cable which originates from the Cat-TV module 41 is passed through it.

Figure 9B:
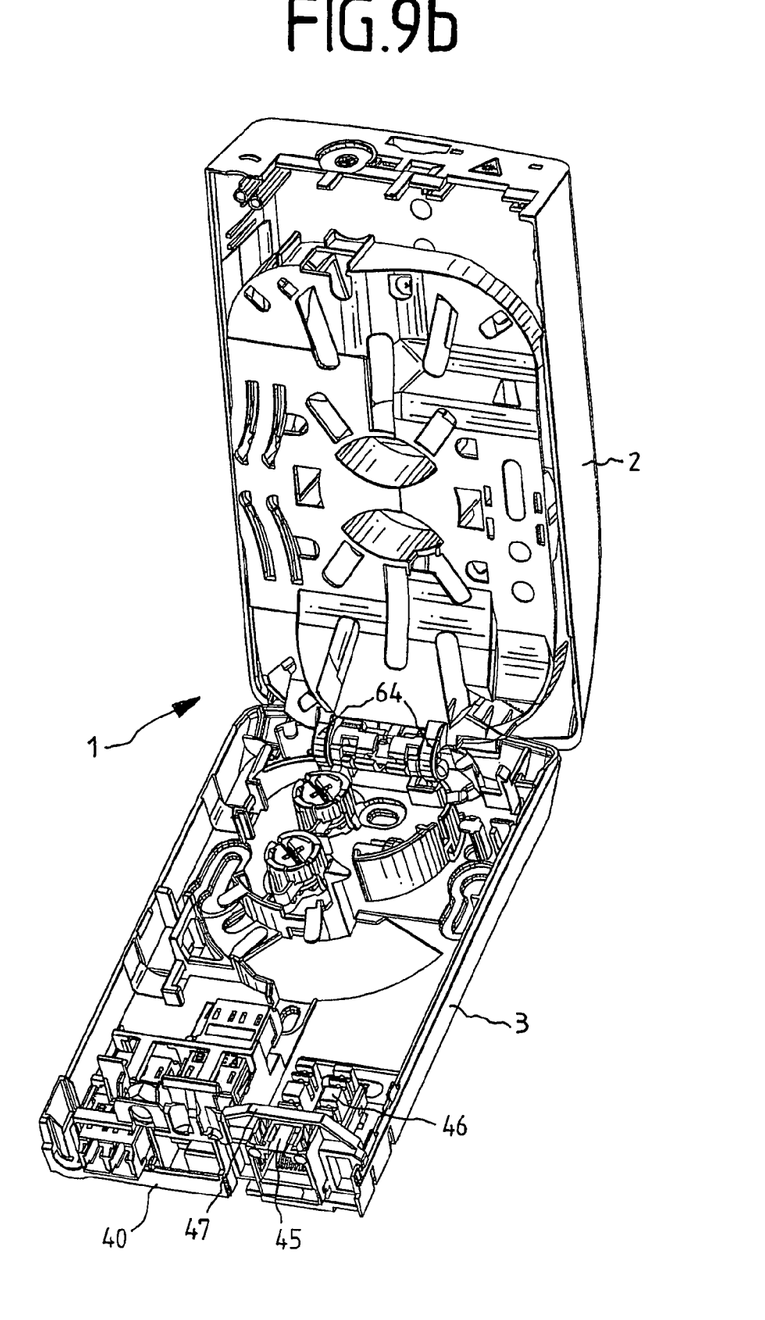
FIG. 9*b* shows a perspective illustration with an electrical plug connector.

FIG. 9*b* shows an alternative fitting of the latching holder 17 of the lower part 3, in which an RJ plug connector 45 followed by insulation-displacement terminal contact strips 46 is latched into the latching holder 17. In this case, the insulation-displacement terminal contacts of the contact strips 46 are electrically connected to spring contacts in the RJ plug connector 45. A matched panel 47 is also arranged on the front end surface 40 of the lower part 3 for the RJ plug connector 45.

Figure 9C:
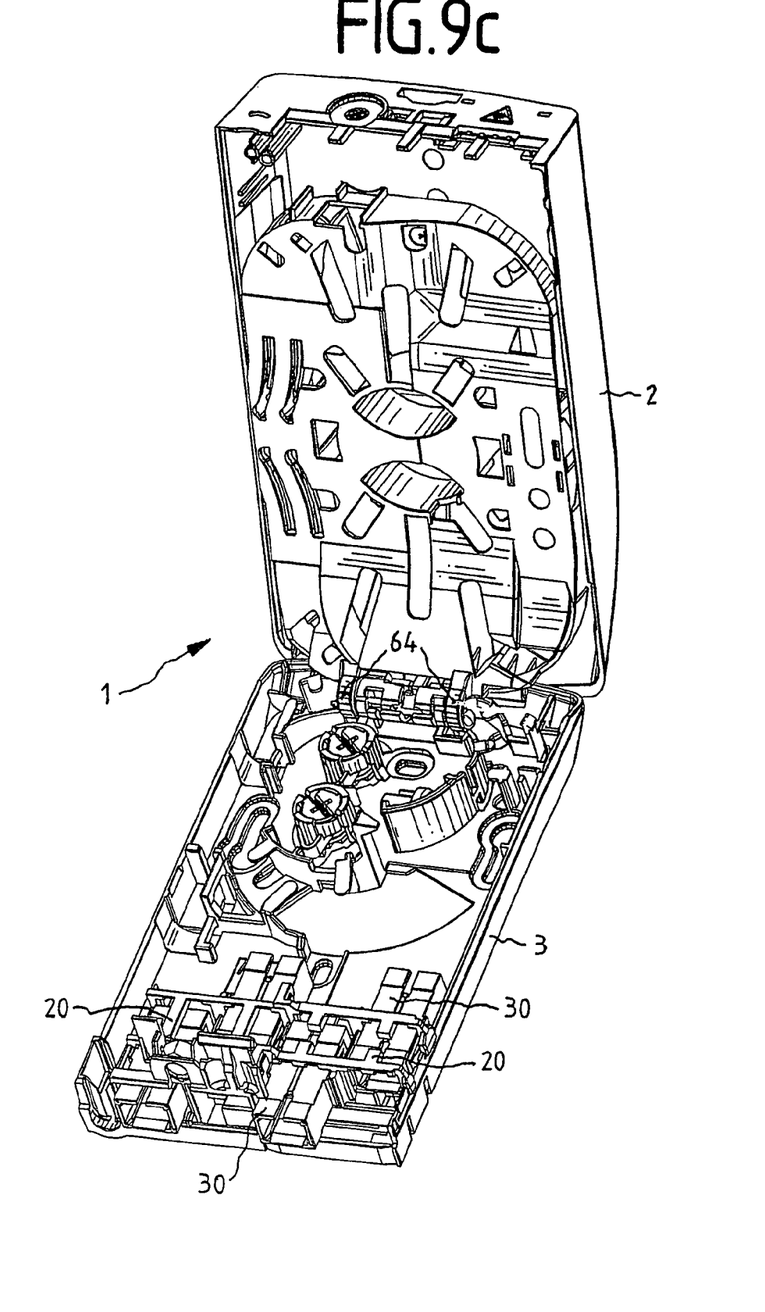
FIG. 9*c* shows a perspective illustration with a further holder for couplings.

FIG. 9*c* shows a further alternative fitting of the latching holder 17 in the lower part 3, in which a holder 20 for couplings 30 is being latched in the latching holder 17. In this case, as in the case of the adjacent holder, the left-hand coupling 30 has been inserted from the front face V, and the right-hand coupling 30 from the rear face R.

The latching holder 17 therefore allows the connecting box 1 to be flexibly and easily matched to widely different applications.

Figure 10A:
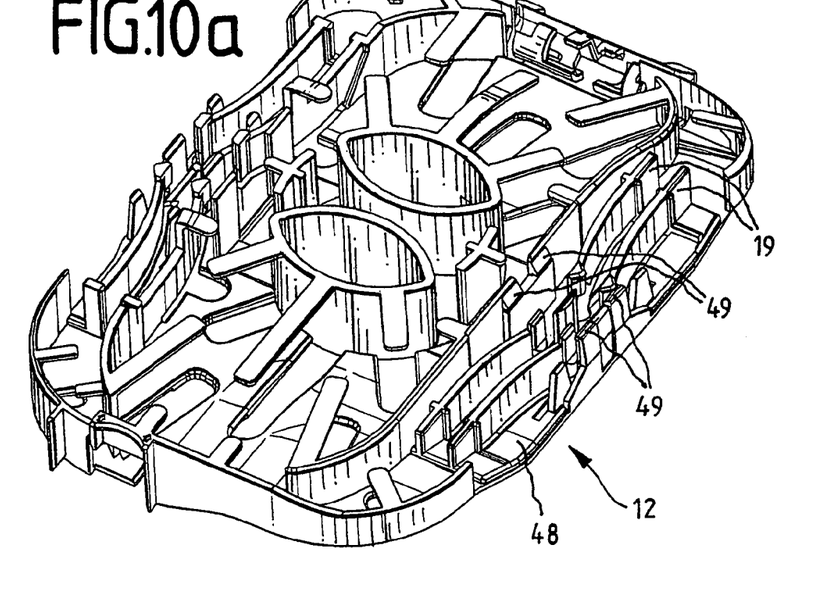
FIG. 10*a* shows a perspective illustration of the support with a further holder for splices.
Figure 10B:
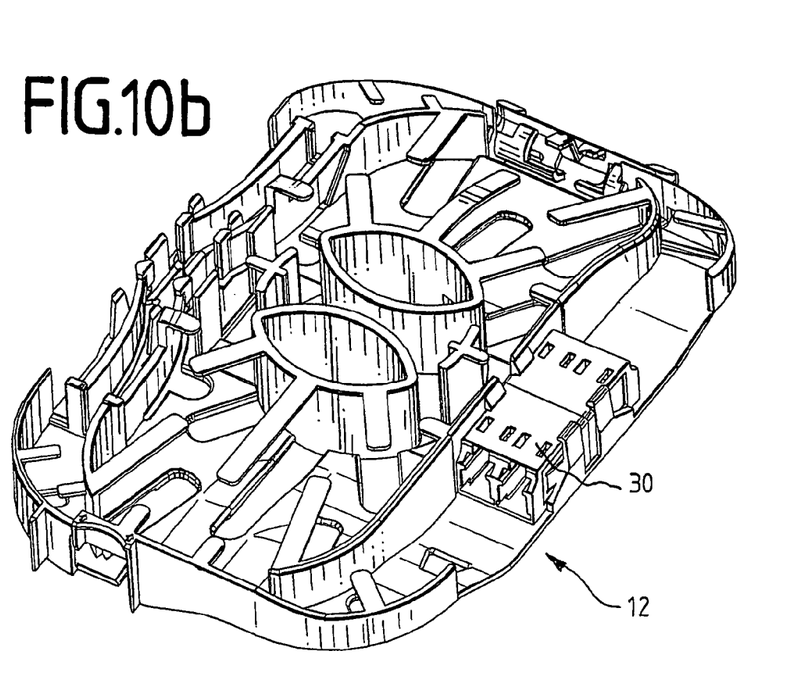
FIG. 10*b* shows a perspective illustration of the support with a coupling for glass fiber plugs.

FIGS. 10a and 10b show how the support 12 can be flexibly matched by appropriate fitting of the latching holder 14. In this case, a support 48 with two holders 19 for four splices is latched in FIG. 10a. In this case, latching tabs 49 on the latching holder 14 latch over wall elements of the holders 19, as a result of which the latter are fixed in the lower part 3. Alternatively, FIG. 10b shows a coupling 30 for glass fiber plugs having been latched in the latching holder 14.

The optical deflection element 11 will now be explained in more detail with reference to FIG. 11. The deflection element 11 is essentially H-shaped. In this case, the lateral stay 50 is used exclusively for connection of the two vertical struts 51. Latching tabs 52 are arranged on the vertical struts 51, on the front face below the lateral stay 50. The latching tabs 52 are used to attach the deflection element 11 to the cover 2. In this state, the LEDs 42 of the CAT-TV module 41 rest on the rear face of the vertical struts 51 under the lateral stay 50. Reflection surfaces 54 are arranged on the front face of the struts 51. The upper faces 53 of the deflection element 11 in this case form the optical output of the deflection element. When the LEDs 42 now emit light, then this light is injected from the rear face of the deflection element 11, strikes the reflection surfaces 54, is reflected upward, and emerges through the upper faces 53.

Figures 11, 12:
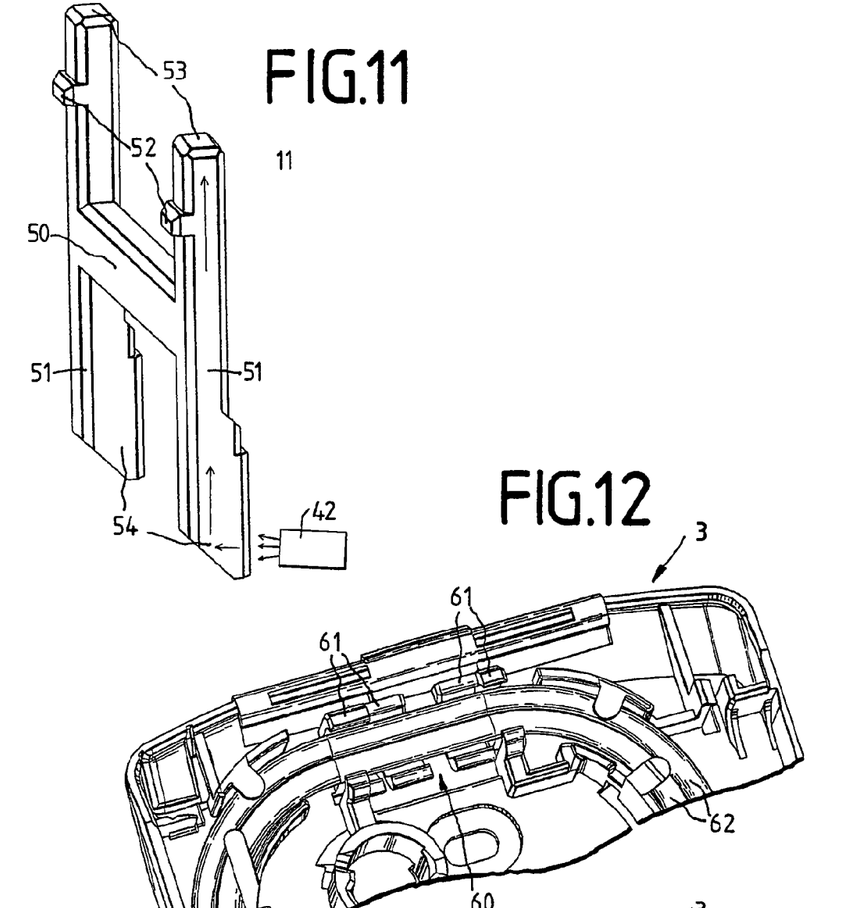
FIG. 11 shows a perspective illustration of an optical deflection element.
FIG. 12 shows a detail illustration of the guidance of drop cables in the pivoting bearing.

FIG. 12 shows a detail view of the lower part 3, with the support 12 having been removed. A pivoting bearing 60 is illustrated in this case, comprising a plurality of elements 61 with radial outer surfaces. The elements 61 in this case have an open contour in which drop cables 62 are guided. Drop cables are glass fiber cables with a diameter of 3 mm and with a glass fiber plug. The inserted drop cable can then be inserted from the front end face of the connecting box, can be guided around over the pivoting bearing 60, and can be terminated in a coupling in the latching holder 17.

Figure 13:
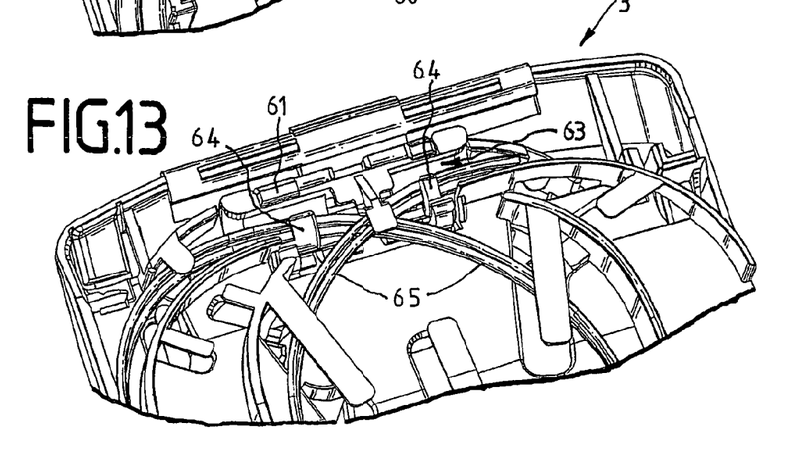
FIG. 13 shows a detail illustration of the guidance of cores in the pivoting bearing.

FIG. 13 illustrates how cores 65 are guided in the pivoting bearing 60 and in the support 12 where they are then, for example, guided for splicing purposes to the holders 19 for splices. In this case, the support 12 has an opposing bearing 63 which can rotate on the pivoting bearing 60, with the pivoting bearing 60 being rigid. In this case, the opposing bearing 63 has two curved elements 64, which can be seen particularly well in FIGS. 9a to 9c. Because of the fact that the cores 65 are guided in the pivoting bearing 60, they are moved only to a minimal extent during a pivoting movement of the support 12.

LIST OF REFERENCE SYMBOLS

1 Connecting box
2 Cover
3 Lower part
4 Rear end surface
5 Front end surface
6 Lugs
7 Holder
8 Thread
9 Opening
10 Lug
11 Deflection element
12 Support
13 Fiber guide element
14 Latching holder
15 Strain relief means
16 Elements
17 Latching holder
18 Hold-down device
19 Holders
20 Holder
21 First vertical struts
22 Second vertical struts
23 Lateral stays
24 Lateral stays
25 Webs
26 Base part
27 Latching elements
30 Coupling
31 Side surface
332 Stop edge
33 Spring lug
34 Upper face
35 Groove
40 End surface
41 Cat-TV module
42 LEDs
43 Panel
44 Cable
45 RJ plug connector
46 Insulation-displacement terminal contact strips
47 Panel
48 Support
49 Latching tabs
50 Lateral stay
51 Vertical strut
52 Latching tabs
53 Upper face
54 Reflection surfaces
60 Pivoting bearing
61 Elements
62 Drop cable
63 Opposing bearing
64 Curved element
65 Cores (with glass fibers)
R Rear face
V Front face

The invention claimed is:

1. A connecting box for glass fiber cables, comprising;
a housing which is formed from at least two parts and has a lower part and a cover,
at least one holder for a coupling for holding glass fiber plugs arranged within the housing, the holder including a double frame which includes two first vertical struts and two second vertical struts, the second vertical struts being arranged closer to a front face of the cover and of the lower part than the first vertical struts, and the holder being configured to receive the coupling selectively at a first position or at a second position that is located closer to the front face of the lower part than the first position, the first vertical struts latchingly receiving the coupling when the coupling is disposed at the first position, and the second vertical struts latchingly receiving the coupling when the coupling is disposed at the second position.

2. The connecting box as claimed in claim 1, wherein the holder is in the form of a double holder for two couplings.

3. The connecting box as claimed in claim 1, wherein at least one optical deflection element is arranged in the connecting box, the optical output of which optical deflection element is aligned with an upper face of the cover, with the cover being transparent in this area.

4. The connecting box as claimed in claim 1, wherein a pivotable support having at least one holder for splices is arranged between the lower part and the cover, with the support and the holder being formed integrally.

5. The connecting box as claimed in claim 4, wherein the support has a latching holder in which at least one further holder for splices or a coupling for glass fiber plugs can optionally be latched.

6. The connecting box as claimed in claim 4, wherein a pivoting bearing which has an open contour is arranged on the lower part.

7. The connecting box as claimed in claim 6, wherein the support is formed with an opposing bearing which can rotate about the pivoting bearing of the lower part.

8. The connecting box as claimed in claim 6, wherein drop cables or cores are guided in the pivoting bearing.

9. The connecting box as claimed in claim 1, wherein the lower part is formed with a latching holder, into which an active or passive electrical or optical component can optionally be inserted.

* * * * *